US007389363B2

(12) United States Patent
Clark et al.

(10) Patent No.: US 7,389,363 B2
(45) Date of Patent: Jun. 17, 2008

(54) SYSTEM AND METHOD FOR FLEXIBLE MULTIPLE PROTOCOLS

(75) Inventors: Scott Douglas Clark, Rochester, MN (US); Charles Ray Johns, Austin, TX (US); James Allan Kahle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 11/050,022

(22) Filed: Feb. 3, 2005

(65) Prior Publication Data

US 2006/0179168 A1 Aug. 10, 2006

(51) Int. Cl.
*G06F 3/00* (2006.01)
(52) U.S. Cl. ...................................................... 710/11
(58) Field of Classification Search .................. 710/11
See application file for complete search history.

(56) References Cited

U.S. PATENT DOCUMENTS 4,079,452 A * 3/1978 Larson et al. .................. 710/11
5,574,859 A * 11/1996 Yeh ............................ 710/300

* cited by examiner

*Primary Examiner*—Ilwoo Park
*Assistant Examiner*—Juanito C Borromeo
(74) *Attorney, Agent, or Firm*—VanLeeuwen & VanLeeuwen; D'Ann N. Rifai

(57) ABSTRACT

A system and method for flexible multiple protocols are presented. A device's logical layer may be dynamically configured on a per interface basis to communicate with external devices in a coherent or a non-coherent mode. In coherent mode, commands such as coherency protocol, system commands, and snoop response pass from the device's internal system bus to an external device, thereby creating a logical extension of the devices internal system bus. In non-coherent mode, the input-output bus unit receives commands from the internal system bus and generates non-coherent input-output commands, which are eventually received by an external device.

9 Claims, 7 Drawing Sheets

SYSTEM AND METHOD FOR FLEXIBLE MULTIPLE PROTOCOLS

BACKGROUND OF THE INVENTION

1. Technical Field

The present invention relates in general to a system and method for flexible multiple protocols. More particularly, the present invention relates to a system and method to dynamically configure a device's logical layer interface to communicate with an external device in a coherent mode or a non-coherent mode.

2. Description of the Related Art

The amount of input-output ports that are physically available on a processor chip for interconnect purposes is limited due to the physical size of the input-output drivers and receivers, the number of escapes to the next level of packaging, power restrictions, and other such factors. A single processor may be used in multiple system configurations that require multiple types of interfaces. In addition, these multiple configurations may also have varying bandwidth requirements for the individual interfaces. For example, a processor that is used in a particular application may require a significant amount of non-coherent input-output bandwidth for applications such as clustering or graphics. A different application may require the same processor to support a coherent connection to other processors in order to form a larger computer system.

A challenge found is that designing a processor to support multiple required protocol interfaces and worst case bandwidth requirements on each interface is costly due the large number of physical I/O that would be required, circuits required to drive the I/O, and power required to support the I/O, as well as physical limitations of higher levels of packaging.

A circuit designer understands the impracticality of including an over abundance of interfaces in a circuit design and, therefore, scrutinize which interfaces to include in a particular circuit design. In order to determine which interfaces to include in a circuit design, the circuit designer attempts to identify interfaces that a customer may wish to use when connecting peripherals to the device. For example, a circuit designer may know that customers may wish to communicate with peripheral devices using USB ports. In this example, the circuit designer determines the most practical number of USB interfaces to include in the design.

A challenge found with this approach, however, is that processors with fixed interfaces are limited in which peripheral devices may be connected, which results in limited applications.

What is needed, therefore, is a system and method to dynamically select a device's communication protocols based upon its externally connected devices.

SUMMARY

It has been discovered that the aforementioned challenges are resolved using a system and method for flexible multiple protocols to dynamically configure a device's logical layer interface. A device's logical layer may be dynamically configured on a per interface basis to communicate with external devices in a coherent or a non-coherent mode. In coherent mode, an external device is "connected" to a logical extension of the device's internal system bus and has a direct "view" of the device's internal memory. In non-coherent mode, an external device may be connected that does not include logic that supports the device's internal coherent system bus protocols.

A device includes an element interface unit (EIU) that manages communication between the device and external devices. The EIU interfaces with an element interconnect bus (a high speed internal bus) and physical input/output pins that the device uses to communicate with external devices. The EIU dedicates the physical input/output pins to particular interfaces, and dynamically creates multiple configurable interfaces, whereby each of the interfaces communicates with a separate external device. The EIU includes a configurable logical layer, a link protocol layer, shuffle logic, and an input/output pack selection to accomplish this task.

The input/output pack selection divides the physical input-output pins into multiple interfaces and the shuffle logic maps the device's internal dataflow to the data width that is selected for the corresponding interfaces. The link protocol layer generates packets and error detection information on the transmit side, and performs error checking and packet disassembly on the receive side. Information provided to the link layer is protocol dependent and may be non-coherent input/output transactions (i.e. reads, writes, interrupts and associated data), or a coherent extension of the internal system bus (commands, reflected commands, snoop responses, combined snoop responses and data transfers).

The EIU uses an input-output bus unit to support multiple logical layer interface modes. The logical layer interface mode may be a coherent mode or a non-coherent mode for each individual interface. In coherent mode, commands such as coherency protocol, system commands, and snoop response pass from the device's internal system bus to an external device, thereby creating a logical extension of the devices internal system bus. In non-coherent mode, the input-output bus unit receives commands from the internal system bus and generates non-coherent input-output commands, which are eventually received by an external device.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
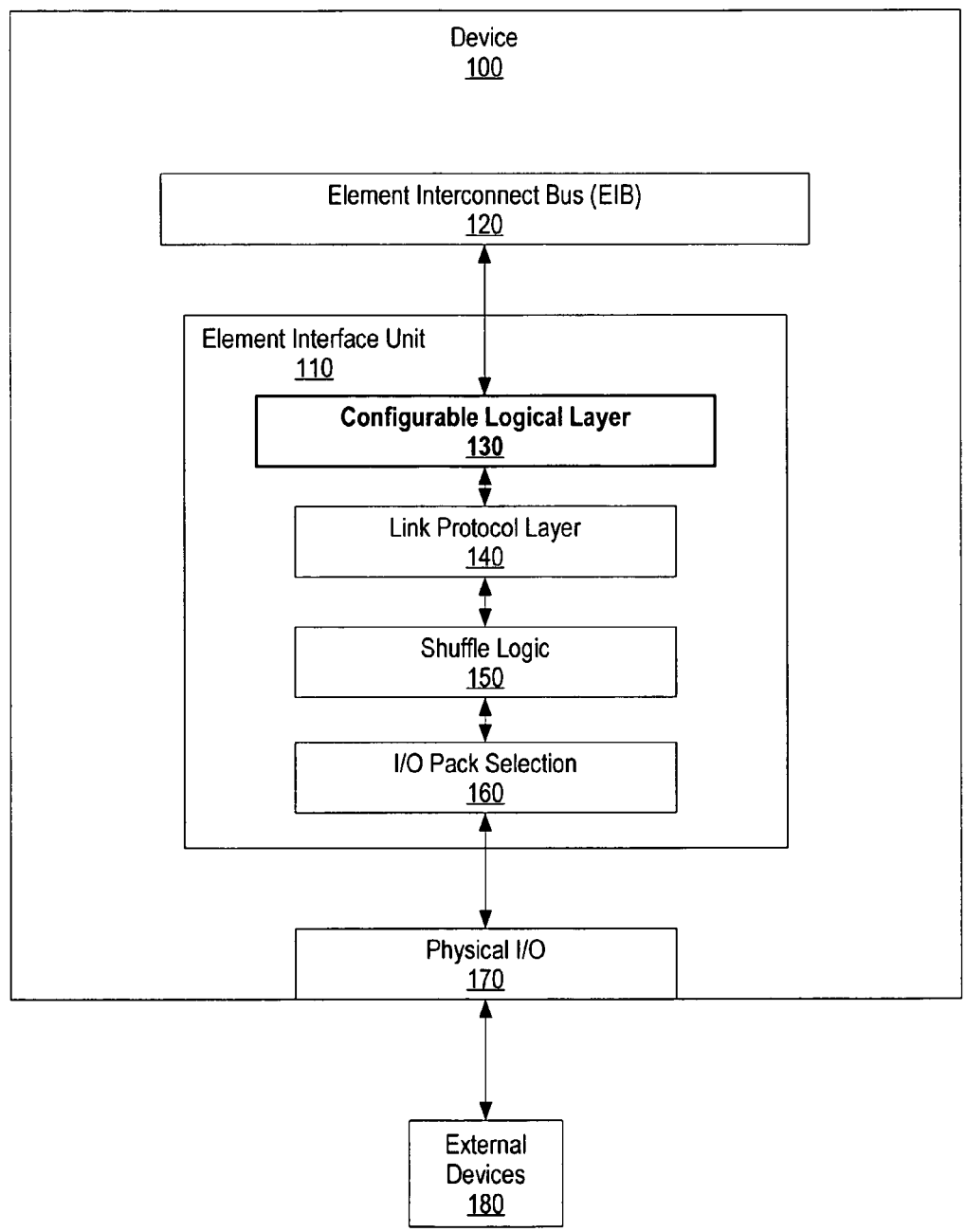
FIG. 1 is a diagram showing a device with a configurable logical layer interface.

FIG. 1 is a diagram showing a device that includes a logical layer interface that is configured based upon the interface types of external devices. A device's logical layer may be dynamically configured on a per interface basis to communicate with external devices in a coherent or a non-coherent mode. In coherent mode, an external device is connected to a logical extension of the device's internal system bus and has a direct "view" of the device's internal memory. In non-coherent mode, an external device may be connected that does not include logic that supports the device's internal coherent system bus protocols.

Device 100 includes element interface unit (EIU) 110 that manages communication between device 100 and external devices 180. EIU 110 interfaces with element interconnect bus (EIB) 120, which is a high speed internal bus, and physical input/output 170, which are the physical pins that device 100 uses to communicate with external devices 180.

EIU 110 dedicates pins that are included in physical input/output 170 to particular interfaces, thereby dynamically creating multiple configurable interfaces, whereby each of the interfaces communicates with a separate external device. EIU 110 includes configurable logical layer 130, link protocol layer 140, shuffle logic 150, and input/output pack selection 160 to accomplish this task.

Input/output pack selection 160 divides physical input/output 170 into multiple interfaces (e.g. two interfaces). Shuffle logic 150 maps device 100's internal dataflow to the data width that is selected for the corresponding interfaces. Link protocol layer 140 generates packets and error detection information on the transmit side, and performs error checking and packet disassembly on the receive side. Information provided to the link layer is protocol dependent and may be non-coherent I/O transactions (i.e. reads, writes, interrupts and associated data), or a coherent extension of the internal system bus (commands, reflected commands, snoop responses, combined snoop responses and data transfers). Link protocol layer 140 provides the flexibility for element interconnect bus 120 to function asynchronous to the operation of physical input/output 170.

Device 100 programs a logical layer interface mode into configurable logical layer 130 for each interface based the external device type that is connect to device 100. The logical layer interface mode may be a coherent mode or a non-coherent mode for each individual interface, and is implemented in an input-output bus unit (see FIG. 2 and corresponding text for an example).

Figure 2:
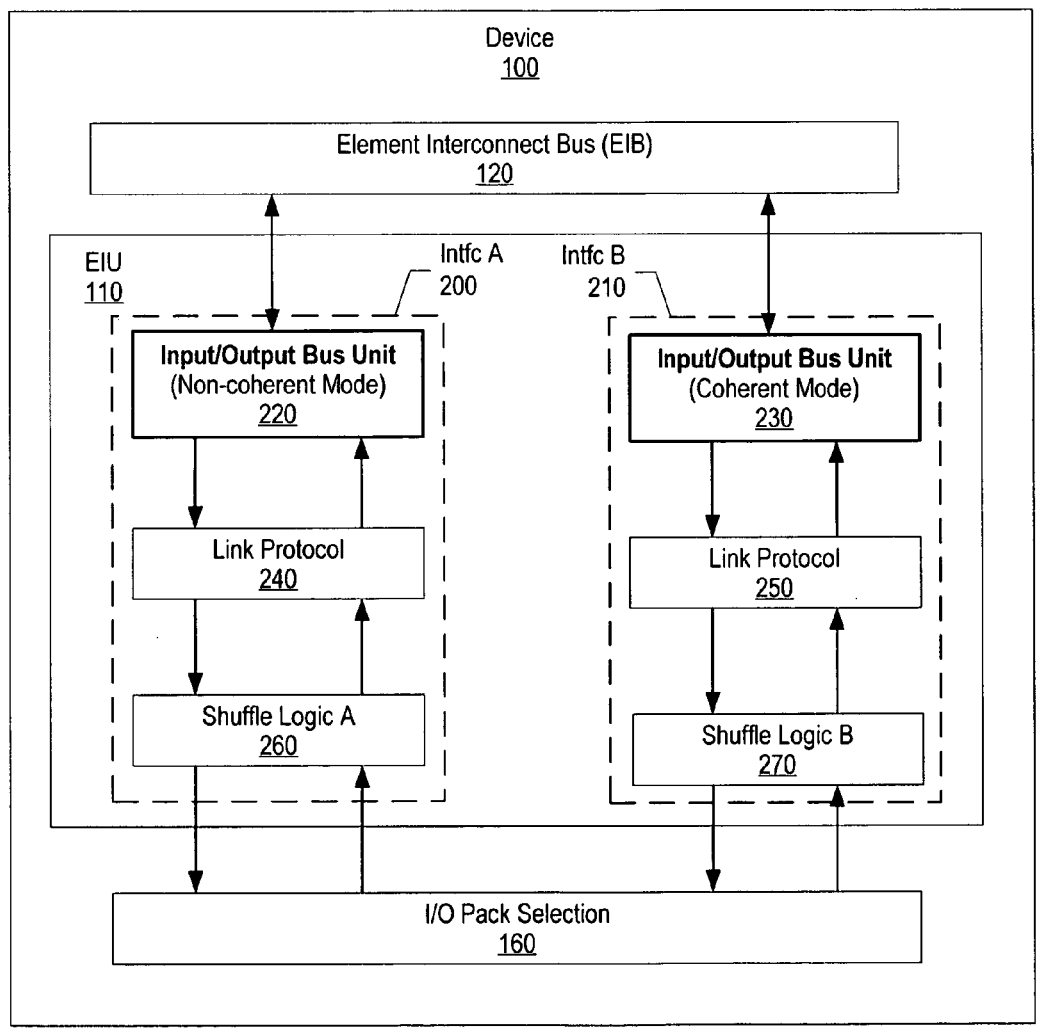
FIG. 2 is diagram showing two logical layer interfaces that may be independently configured based upon which device type is connected to their respective interfaces.

FIG. 2 is diagram showing two interfaces whose logical layers are independently configured. FIG. 2 shows details of element interface unit (EIU) 110 that has been configured to support two interfaces, whereby one of the interfaces is a coherent interface and the other interface is a non-coherent interface.

EIU 110 supports interface A 200 and interface B 210. Interface A 200 includes input-output bus unit 220 that performs logical layer functions, such as configurable logical layer 130 shown in FIG. 1. Input-output bus unit 220 has been configured for non-coherent mode in order for device 100 to communicate with an external device over a non-coherent channel. Input-output bus unit 220 communicates with element interconnect bus (EIB) 120 in a non-coherent manner.

Interface A 200 also includes link protocol 240 and shuffle logic 260. Link protocol 240 generates packets and error detection information from data it receives from input-output bus unit 220, and performs error checking and packet disassembly on data it receives from shuffle logic A 260. Shuffle logic A 260 communicates with input-output pack selection 160 and maps device 100's internal dataflow to the width selected for interface A 200.

Interface B 210 includes input-output bus unit 230 that performs configurable logical layer 130 functions shown in FIG. 1. Input-output bus unit 230 has been configured for coherent mode in order for device 100 to communicate with an external device over a coherent channel. Input-output bus unit 230 communicates with element interconnect bus (EIB) 120 in a coherent manner.

Interface B 210 also includes link protocol 250 and shuffle logic 270. Link protocol 250 generates packets and error detection information from data it receives from input-output bus unit 230, and performs error checking and packet disassembly on data it receives from shuffle logic B 270. Shuffle logic B 270 communicates with input-output pack selection 160 and maps device 100's internal dataflow to the width selected for interface B 210.

Figure 3:
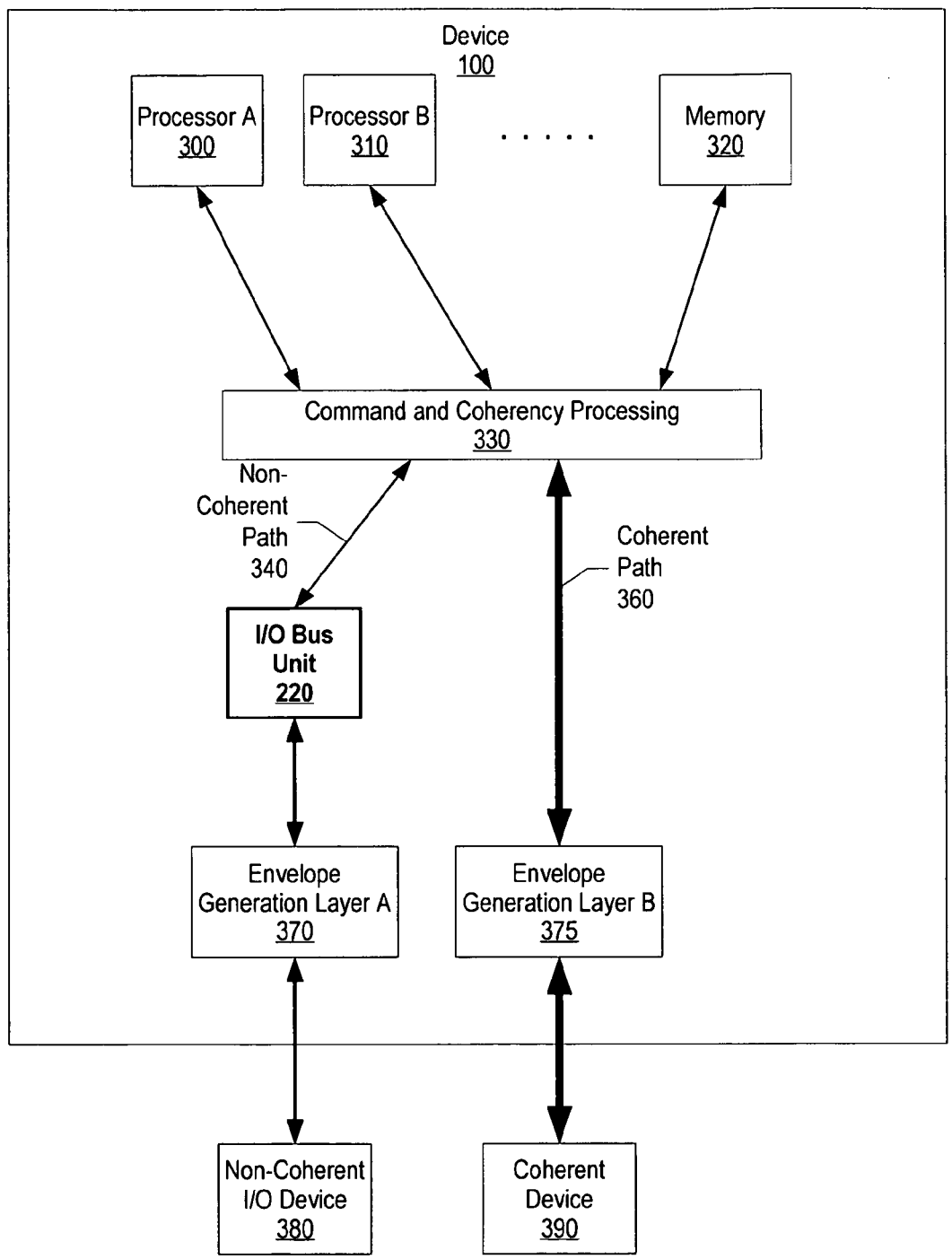
FIG. 3 is a diagram showing a coherent and non-coherent addressing path.

FIG. 3 is a diagram showing coherent and non-coherent command paths for a device that communicates with a coherent and a non-coherent external device. The example shown in FIG. 3 corresponds with the example shown in FIG. 2, whereby device 100 has configured one of its interfaces in a non-coherent mode and another one of its interfaces in a coherent mode.

Device 100 includes internal elements, such as processor A 300, processor B 310, and memory 320. Device 100's internal elements pass system commands to each other (i.e. command and coherency processing 330) over a high-speed internal bus, such as EIB 120 shown in FIG. 1.

One of device 100's interfaces (interface A 200 shown in FIG. 2) is configured for non-coherent mode and, as such, device 100 uses input-output bus unit 220 to receive system bus commands from command and coherency processing 330 via non-coherent path 340, and provide non-coherent input-output commands to envelope generation layer 370. Envelope generation layer A 370 is the "front end" of link protocol layer 140 (shown in FIG. 1), and generates packets using the non-coherent input-output commands. The packets eventually are received by non-coherent input-output device 380 for processing.

Device 100's other interface (interface B 210 shown in FIG. 2) is configured for coherent mode and, as such, the interface does not require an input-output bus unit to convert system bus commands to non-coherent input-output commands, but rather coherency protocol, system commands, and snoop response pass from command and coherency processing 330 directly to envelope generation layer B 375 via coherent path 360, which is a logical extension of device 100's internal system bus. Envelope generation layer B 375 generates packets from the coherent system commands, which are eventually received by coherent device 390.

Figure 4:
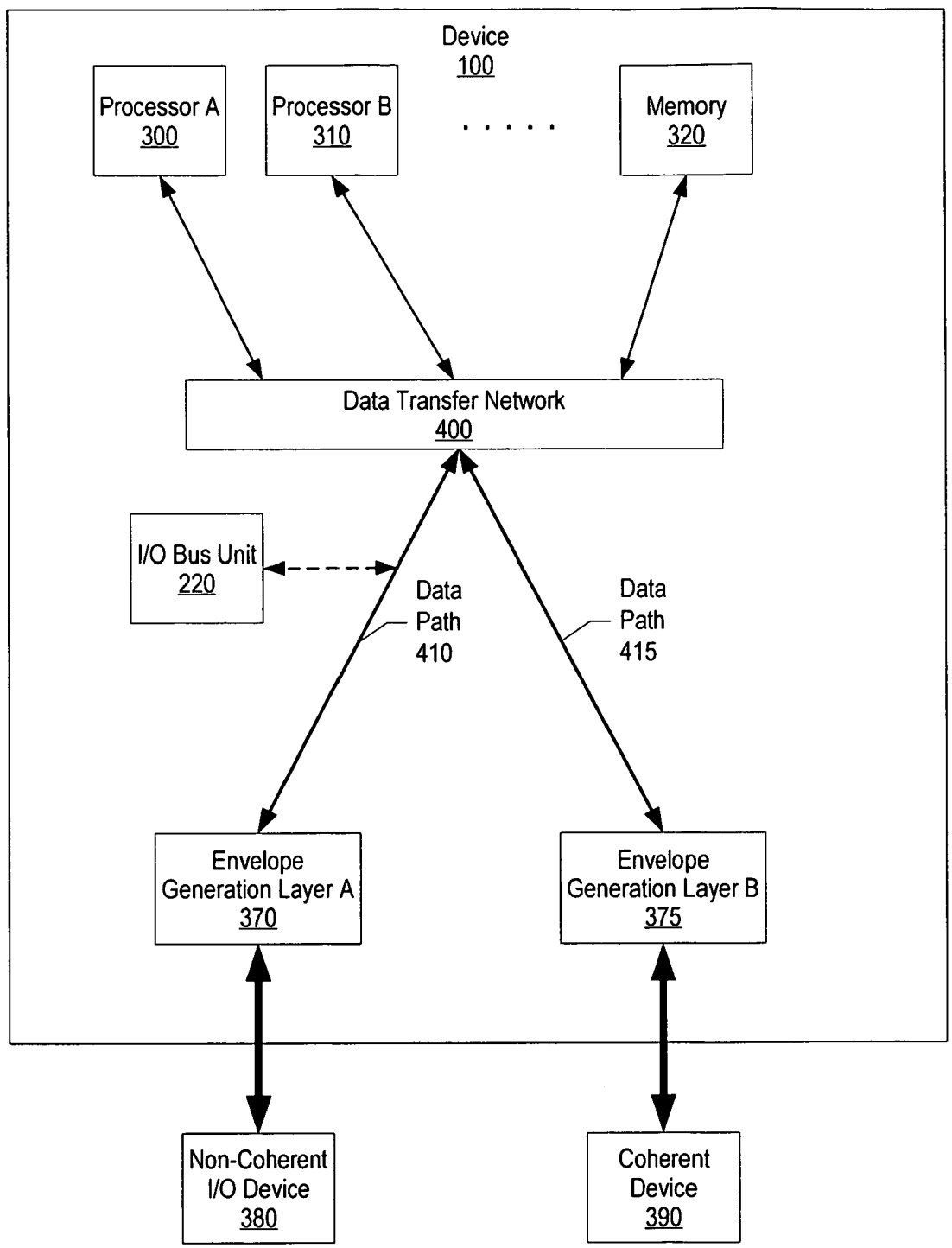
FIG. 4 is a diagram showing a coherent and non-coherent data path.

FIG. 4 is a diagram showing a device's coherent mode and non-coherent mode data paths. The example shown in FIG. 4 corresponds with the example shown in FIG. 2, whereby device 100 has configured interface A 200 in non-coherent mode and interface B 210 in coherent mode. As will be discussed below, the data path for non-coherent mode and coherent mode is similar.

Device 100 includes internal elements, such as processor A 300, processor B 310, and memory 320, which are the same as those shown in FIG. 3. Device 100's internal elements transfer data to each other (i.e. data transfer network 400) over a high-speed internal bus, such as EIB 120 shown in FIG. 1.

When device 100 transfers data to non-coherent input-output device 380, the data passes along data transfer network 400, along data path 410, and to envelope generation layer A 370. Input-output bus unit 220 manipulates the routing information ("tags") that are associated with the data in order to map it to the routing information required by the non-coherent interface. Input-output bus unit 220, envelope generation layer A 370, and non-coherent input-output device 380 are the same as that shown in FIG. 3. Envelope generation layer A 370 then provides the data to non-coherent input-output device 380.

When device 100 transfers data to coherent device 390, the data passes along data transfer network 400, along data path 415, and to envelope generation layer B 375. Envelope generation layer B 375 then provides the data to coherent device 390. In coherent mode, an input-output bus unit is not required because a coherent interface provides a logical extension of device 100's internal system bus to an external device. Envelope generation layer B 375, and coherent device 390 are the same as those shown in FIG. 3.

Figure 5A:
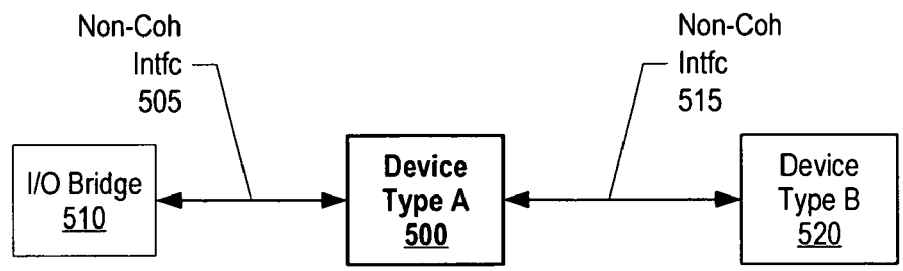
FIG. 5A is a diagram showing non-coherent device connections.

FIG. 5A is a diagram showing non-coherent device connections. Device type A 500 includes the invention described herein, and is able to dynamically configure its interfaces based upon which devices are connected to its physical input/output pins.

The example shown in FIG. 5A shows device type A 500 connected to input-output bridge 510 and device type B 520. Both devices communicate with device type A 500 in non-coherent mode using non-coherent interface 505 and non-coherent interface 515. In one embodiment, if device type B includes the invention described herein and is capable of communicating in coherent mode using the same physical input/output pins, device type A 500 and device type B 520 may dynamically program their interfaces such that they communicate with one another in coherent mode without changing their physical connections to each other.

Figure 5B:
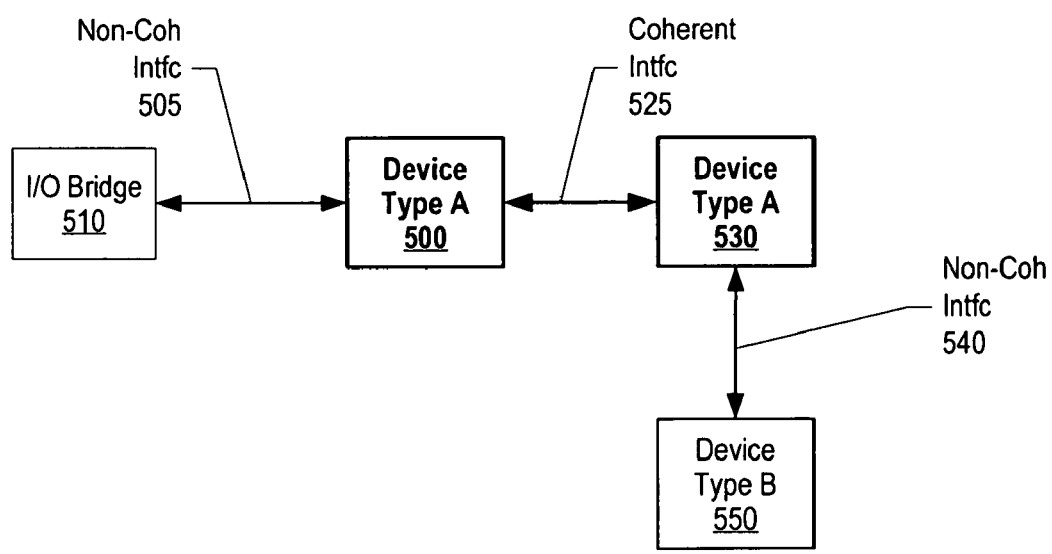
FIG. 5B is a diagram showing coherent and non-coherent device connections.

FIG. 5B is a diagram showing coherent and non-coherent device connections. FIG. 5A shows two devices that incorporate the invention described herein, which are device type A 500 and device type A 530. Both devices communicate with each other in coherent mode using coherent interface 525. As such, device type A 500 has a direct view of device type A 530's internal memory, and visa versa.

Device type A 500 is also non-coherently connected to input-output bridge 510 using non-coherent interface 505, which is the same as that shown in FIG. 5A. In addition, device type A 530 is non-coherently connected to device type B 550 using non-coherent interface 540.

In one embodiment, multiple devices may be connected to a switch using coherent interfaces which, therefore, includes each of the devices in the same coherency domain.

Figure 6:
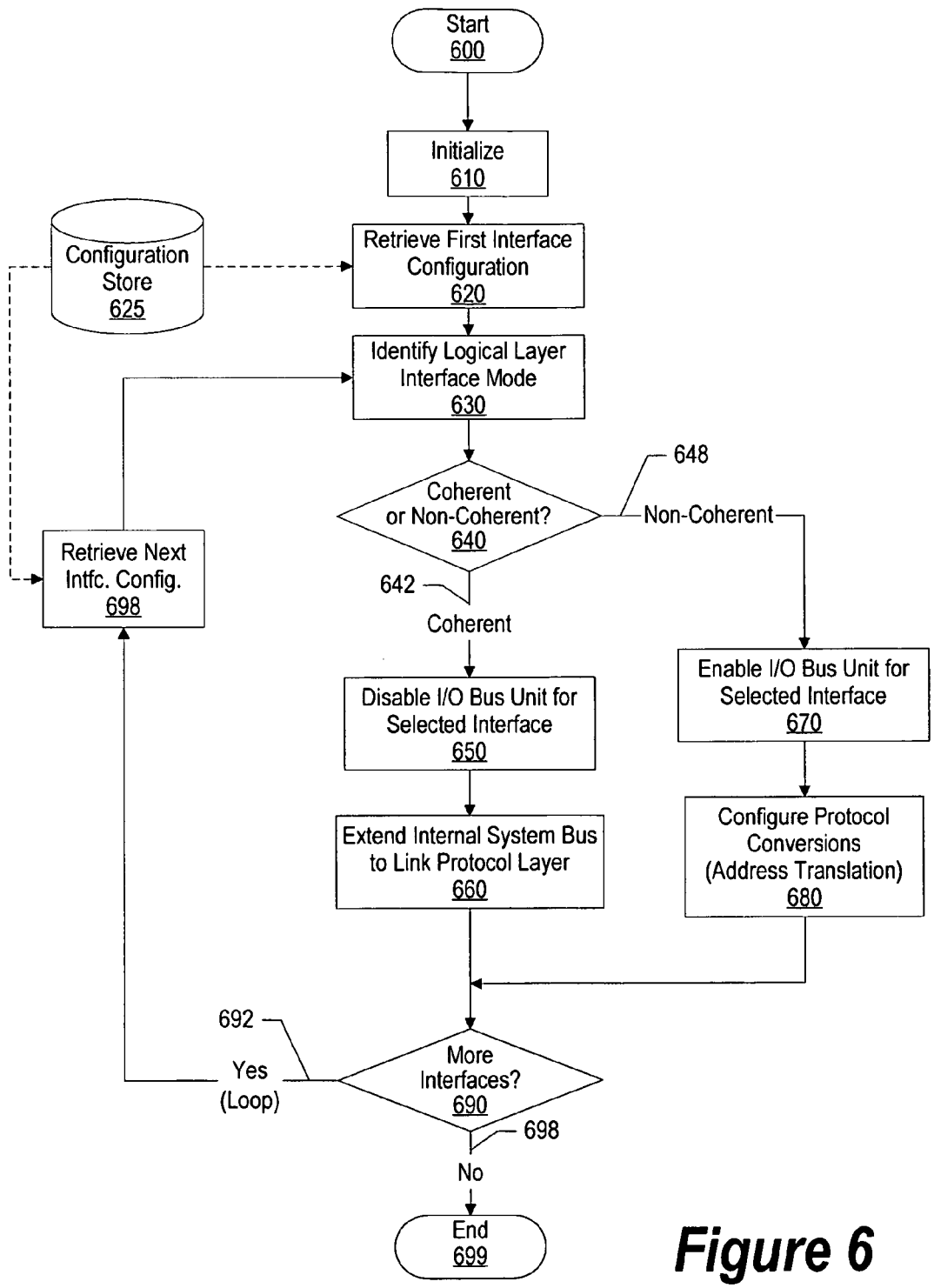
FIG. 6 is a flowchart showing steps taken in configuring input/output bus units to support particular logical layer interface modes.

FIG. 6 is a flowchart showing steps taken in configuring input/output bus units to support particular logical layer interface modes. Processing commences at 600, whereupon the system initializes at step 610. At step 620, processing retrieves an interface configuration that corresponds to a device's first interface from configuration store 625. Configuration store 625 may be stored on a nonvolatile storage area, such as a computer hard drive. Processing identifies a logical layer interface mode that corresponds to the first interface (step 630), and a determination is made as to whether the identified interface mode is a coherent mode or a non-coherent mode (decision 640).

If the first interface should be configured for coherent mode, decision 640 branches to "Coherent" branch 642 whereupon processing disables the first interface's input/output bus unit (step 650) because a coherent interface does not require logical layer interaction because, in coherent mode, there no conversion is required since the device's internal system bus is logically extended. At step 660, processing extends the device's internal system bus to the first interface's link protocol layer, thereby creating a logical extension of the device's internal system bus to the external device.

On the other hand, if the first interface should be configured for non-coherent mode, decision 640 branches to "Non-coherent" mode 648 whereupon processing enables an input/output bus unit that corresponds to the first interface (step 670), and configures the input/output bus unit to perform a protocol conversion from a device's internal coherent interface, to a different, non-coherent interface (step 680).

A determination is made as to whether there are more interfaces to configure (decision 690). If there are more interfaces to configure, decision 690 branches to "Yes" branch 692 which loops back to retrieve (step 698) and process the next interface configuration. This looping continues until there are no more interfaces to configure, at which point decision 690 branches to "No" branch 698 whereupon processing ends at 699.

Figure 7:
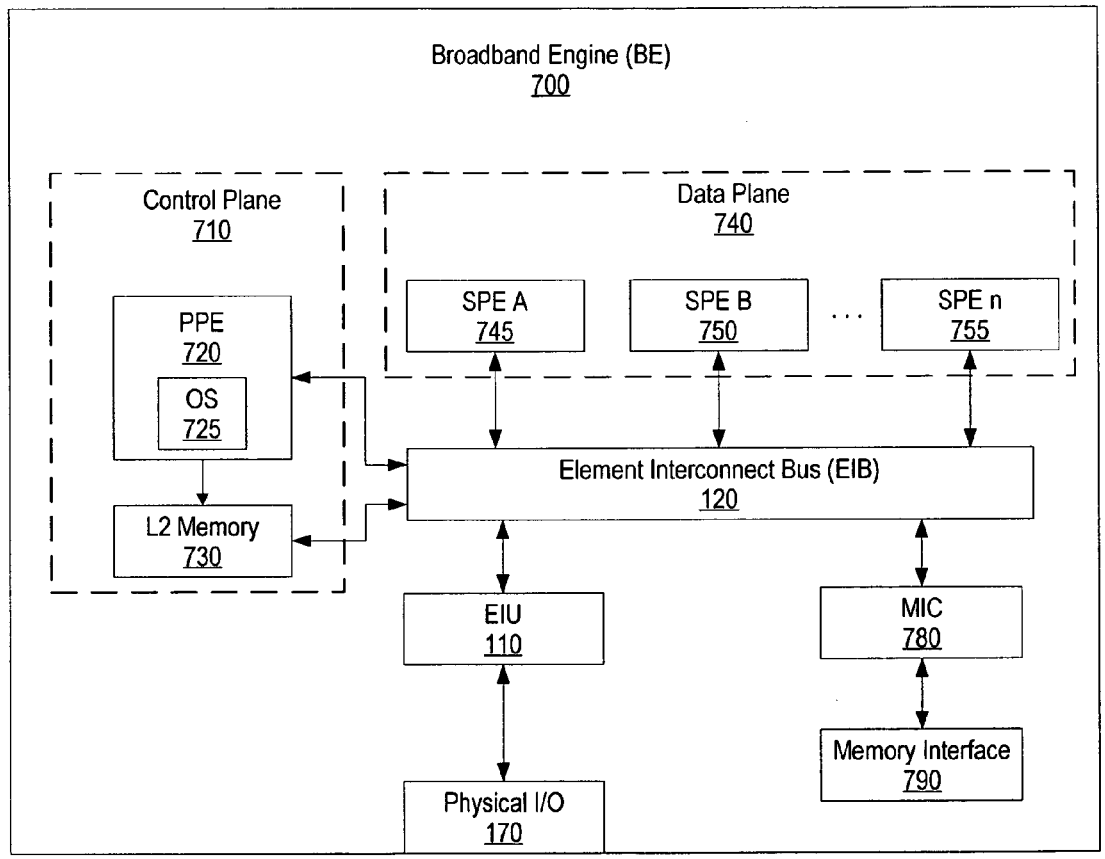
FIG. 7 is a block diagram of a computing device capable of implementing the present invention.

FIG. 7 is a block diagram of a computing device capable of implementing the present invention. The architecture shown in FIG. 7 includes heterogeneous processors that share a common memory and a common bus. Broadband Engine (BE) 700 sends and receives information to/from external devices through element interconnect unit (EIU) 110, and distributes the information to control plane 710 and data plane 740 using element interconnect bus 120. EIU 110 and EIB 160 are the same as that shown in FIG. 1. Control plane 710 manages BE 700 and distributes work to data plane 740.

In addition, element interconnect bus (EIU) 160 provides read and write requests to memory interface controller (MIC) 780. Memory interface controller 780 communicates the requests to memory interface 790 that, in turn, communicates with external memory.

Control plane 710 includes power processing element (PPE) 720, which runs operating system (OS) 725. For example, PPE 720 may be a Power PC core that is embedded in BE 700 and OS 725 may be a Linux operating system. PPE 720 manages a common memory map table for BE 700. The memory map table corresponds to memory locations included in BE 700, such as L2 memory 730 as well as non-private memory included in data plane 740.

Data plane 740 includes Synergistic Processing Elements (SPE's) 745, 750, and 755. Each SPE is used to process data information and each SPE may have different instruction sets. For example, BE 700 may be used in a wireless communications system and each SPE may be responsible for separate processing tasks, such as modulation, chip rate processing, encoding, and network interfacing. In another example, each SPE may have identical instruction sets and may be used in parallel to perform operations benefiting from parallel processes. Each SPE includes a synergistic processing unit (SPU), which is a processing core, such as a digital signal processor, a microcontroller, a microprocessor, or a combination of these cores.

SPE 745, 750, and 755 are connected to element interconnect bus (EIB) 120, which passes information between control plane 710, data plane 740, EIU 110, and MIC 780. EIB 120 is an on-chip coherent multi-processor bus, and is the same as that shown in FIG. 1. EIU 770 includes flexible input-output logic, which dynamically assigns interface pins to input-output controllers based upon peripheral devices that are connected to BE 700.

While the computer system described in FIG. 7 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A program product comprising:
computer readable code stored in computer memory, the computer readable code being effective to:
retrieve a first interface configuration at a device corresponding to a first external device;
identify a first logical layer interface mode as a coherent mode that corresponds to the first interface configuration;
configure a first interface included in the device that corresponds to the first interface configuration based upon the first logical layer interface mode, which results in the first interface configured to pass system bus commands, coherency protocol, and snoop responses between a high-speed internal bus and a link protocol layer unit without conversion, wherein the high-speed internal bus and the link protocol layer unit are located within the device;
retrieve a second interface configuration at the device corresponding to a second external device;
identify a second logical layer interface mode as a non-coherent mode that corresponds to the second interface configuration;
configure a second interface included in the device that corresponds to the second interface configuration based upon the second logical layer interface mode, which results in the second interface configured to convert the system bus commands to non-coherent input-output commands and provide the non-coherent input-output commands to the link protocol layer unit; and
communicate with the first external device through the first interface and communicate with the second external device through the second interface.

2. The program product of claim 1 wherein the computer readable code is further effective to:
enable an input-output bus unit corresponding to the second interface; and
program the input-output bus unit to translate addresses based upon the second interface configuration.

3. The program product of claim 1 wherein the computer readable code is further effective to:
use the first interface to connect the device to the first external device; and
wherein the first external device is adapted to interface with the device's internal system bus and the device's internal memory.

4. The program product of claim 3 wherein the computer readable code is further effective to:
retrieve a subsequent interface configuration for the first interface, the subsequent interface configuration including a non-coherent logical layer interface mode; and
re-configure the first interface based upon the subsequent interface configuration, the re-configuring including not altering the connecting.

5. The program product of claim 1 wherein computer readable code is further effective to:
wherein an internal system bus included in the device is asynchronous to the first interface and the second interface.

6. An information handling system comprising:
one or more processors;
an internal system bus accessible by the processors;
a memory accessible by the processors;
one or more interfaces; and
an interface configuration tool accessible by said processors and memory, the interface configuration tool being effective to:
receive a first interface configuration from the processor;

identify a first logical layer interface mode as a coherent mode that corresponds to the first interface configuration;

configure a first interface that corresponds to the first interface configuration based upon the logical layer interface mode, which results in the first interface configured to pass system bus commands, coherency protocol, and snoop responses between a high-speed internal bus and a link protocol layer unit without conversion, wherein the high-speed internal bus and the link protocol layer unit are located within the processor;

receive a second interface configuration from the processor corresponding to a second external device;

identify a second logical layer interface mode as a non-coherent mode that corresponds to the second interface configuration;

configure a second interface that corresponds to the second interface configuration based upon the second logical layer interface mode, which results in the second interface configured to convert the system bus commands to non-coherent input-output commands and provide the non-coherent input-output commands to the link protocol layer unit; and communicate with the first external device through the first interface and communicate with the second external device through the second interface.

7. The information handling system of claim 6 wherein the interface configuration tool is further effective to:

enable an input-output bus unit corresponding to the second interface; and program the input-output bus unit to translate addresses based upon the second interface configuration.

8. The information handling system of claim 6 wherein the interface configuration tool is further effective to:

use the first interface to connect the processor to the first external device; and wherein the first external device is adapted to interface with the processor's internal system bus and internal memory.

9. The information handling system of claim 8 wherein the interface configuration tool is further effective to:

retrieve a subsequent interface configuration for the first interface, the subsequent interface configuration including a non-coherent logical layer interface mode; and re-configure the first interface based upon the subsequent interface configuration, the re-configuring including not altering the connecting.

* * * * *